United States Patent

[11] 3,629,618

[72] Inventor Ted Y. Fujimoto
Santa Ana, Calif.
[21] Appl. No. 67,459
[22] Filed Feb. 27, 1970
[45] Patented Dec. 21, 1971
[73] Assignee North American Rockwell Corporation

[54] FIELD EFFECT TRANSISTOR SINGLE-PHASE CLOCK SIGNAL GENERATOR
5 Claims, 3 Drawing Figs.

[52] U.S. Cl. .......... 307/269, 307/208, 307/246, 307/251, 307/270, 307/304, 328/63
[51] Int. Cl. .......... H03k 17/60
[50] Field of Search .......... 307/205, 208, 237, 246, 251, 269, 270, 304; 328/54, 63, 173, 176

[56] References Cited
UNITED STATES PATENTS

| | | | |
|---|---|---|---|
| 3,506,851 | 4/1970 | Polkinghorn et al. | 307/251 |
| 3,502,908 | 3/1970 | Christensen | 307/246 |
| 3,524,077 | 8/1970 | Kaufman | 307/251 X |
| 3,536,936 | 10/1970 | Rubinstein et al. | 307/269 |

*Primary Examiner*—Stanley T. Krawczewica
*Attorneys*—L. Lee Humphries, H. Fredrick Hamann and Robert G. Rogers

ABSTRACT: An output driver field effect transistor using a feedback capacitor for boosting the voltage on its gate electrode is controlled by single-phase and double-phase clock signals for producing a different single-phase clock signal output having the required voltage level. The voltage level at the output can be provided by a clock signal or by a fixed voltage source.

INVENTOR.
TED Y. FUJIMOTO
BY Robert G. Rogers
ATTORNEY

INVENTOR
TED Y. FUJIMOTO

BY Robert D. Rogers
ATTORNEY

FIELD EFFECT TRANSISTOR SINGLE-PHASE CLOCK SIGNAL GENERATOR

BACKGROUND OF THE INVENTION

1. Field of the Invention

The invention relates to a field effect transistor single-phase clock signal generator and more particularly to such a generator in which the conduction of an output field effect transistor is controlled by a single-phase (single-width) and double-phase (double-width) clock signal for generating a different single-phase clock signal output.

2. Description of Prior Art

Certain microelectronic circuits use a four-phase clock cycle comprising single-width (also called minor, or single-phase) clock signals and double-width (also called major, or double-phase) clock signals. A clock cycle used by many systems comprises $\Phi_1$, $\Phi_{1+2}$, $\Phi_3$ and $\Phi_{3+4}$. For many circuit applications, the $\Phi_2$ and/or $\Phi_4$ clock signals are not required. However, in other circuit applications it is desirable to have such signals available without the necessity for redesigning the basic clock generator circuit.

It would be preferred, therefore, if a circuit could be provided on a separate semiconductor chip or as part of an existing semiconductor chip embodying a microelectronic circuit which utilizes the existing clock signals for generating an additional single-phase clock signal. Such a circuit would not force a designer to change the basic design for a clock generator and would give him greater flexibility in designing or modifying existing microelectronic circuits such as integrated circuits. The present invention provides such a circuit gated by existing single-phase and double-phase clock signals of a multiphase clock cycle for producing a different single-phase clock signal.

SUMMARY OF THE INVENTION

Briefly, the invention comprises a field effect transistor single-phase clock signal generator. The generator includes an output driver using a feedback boosting capacitor and is connected between the generator output and the gate electrode of the output driver for boosting the voltage on the gate electrode at least at the beginning of the single-phase clock signal being generated. In other words, the voltage is boosted during the true period of the single-phase clock signal.

The boosted gate electrode voltage enhances the conduction of the driver for driving the output to the required single-phase clock signal voltage level. The voltage level may be provided from an existing clock signal or from a fixed voltage source. By enhancing the conduction of the driver the threshold voltage drop is reduced and the output voltage level is increased.

A precharge field effect transistor circuit is also connected to the gate electrode for precharging the capacitor prior to the phase of the single-phase clock signal being generated. It is necessary to precharge the capacitor to enable the feedback voltage to boost the gate electrode voltage at the beginning of the phase of the single-phase clock signal being generated.

A second field effect transistor is connected between the output and a reference voltage level for connecting the output to the reference voltage level during the precharge phase of the capacitor. As a result, the capacitor is charged to the difference between one voltage level and the reference voltage level. For most applications, the one voltage level is approximately equal to an existing clock signal level or a supply voltage level. The reference voltage level is ordinarily electrical ground.

The second field effect transistor is turned on at least at the beginning of the precharge phase by a first double-phase clock signal. The second field effect transistor is turned off at the end of the precharge phase, or interval, by a second double-phase clock signal and a first single-phase clock signal.

In order to generate a $\Phi_4$ single-phase clock signal using existing single-phase and double-phase clock signals of a four-phase clocking cycle, $\Phi_{1+2}$,$\Phi_{3+4}$, and $\Phi_3$ clock signals can be used. A supply voltage may be substituted for one or more of the clock signals in certain embodiments. In order to generate a $\Phi_2$ single-phase clock signal using existing clock signals of a four-phase clock cycle, $\Phi_1$, $\Phi_{3+4}$, and $\Phi_{1+2}$ clock signals are used. The supply voltage can be substituted for one or more clock signals in certain embodiments.

N- and P-channel field effect transistor field effect transistors can be used in implementing the embodiments of the present invention. In a preferred embodiment, P-type devices are used. However, in other embodiments N-type field effect transistors and/or P-type field effect transistors can be used to implement an operable embodiment.

In addition, metal oxide semiconductor (MOS) transistors, metal nitride oxide semiconductor (MNOS) transistors, silicon gate transistors, and other types of field effect transistors can be used in implementing the embodiments of the invention. Similarly, although the true interval of a clock signal is used to indicate a logic "1" state, or logic "1" level, other logical conventions can also be used without departing from the scope of the invention. In the preferred embodiment, using P-type MOS field effect transistors, a negative voltage level represents a logic "I" state and an electrical ground voltage level represents a logic "0" state.

Therefore, it is an object of this invention to provide a field effect transistor circuit for generating a single-phase clock signal using existing single- and double-phase clock signals of a multiphase clock cycle.

It is another object of this invention to provide an improved field effect transistor single-phase clock generator having a relatively small size, low noise level, low power requirement, and a relatively high output voltage level.

A still further object of this invention is to provide a single-phase clock signal generator in which the conduction of an output field effect transistor driver is enhanced by a feedback circuit for providing the required output voltage level during the phase of a single-phase clock signal being generated.

A still further object of this invention is to provide a field effect transistor circuit for generating a $\Phi_2$ or $\Phi_4$ single-phase clock signal using the existing $\Phi_{1+2}$, $\Phi_{3+4}$, $\Phi_1$ and $\Phi_3$ clock signals in combination with a voltage-boosting circuit for enhancing the conduction of an output field effect transistor driver.

These and other objects of this invention will become more apparent when taken in connection with the following description of drawings, a brief description of which follows:

DESCRIPTION OF PREFERRED EMBODIMENTS

Figure 1:
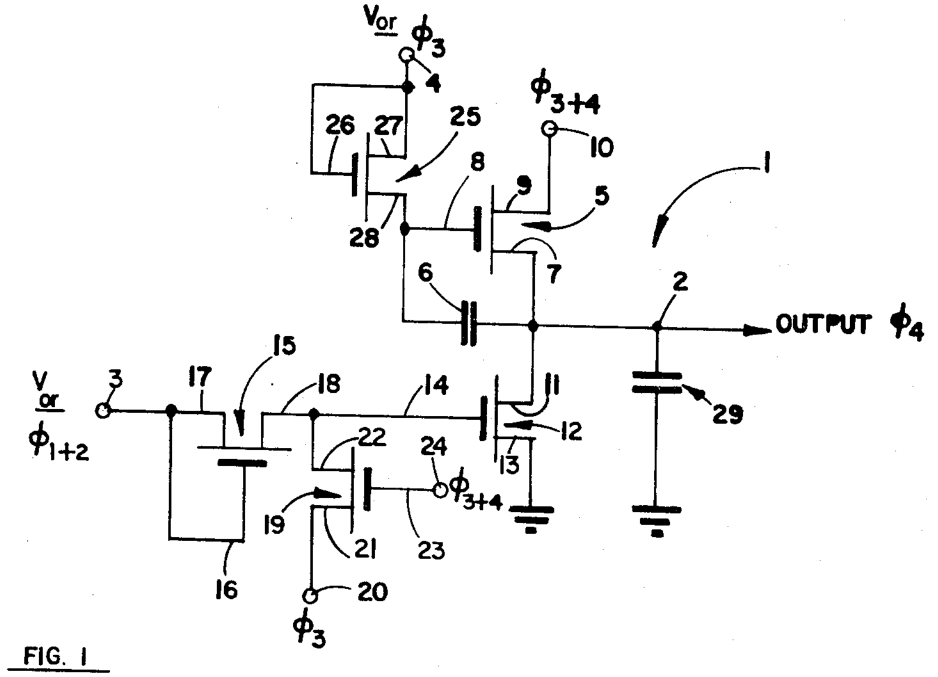
FIG. 1 is a schematic diagram of one embodiment of a single-phase clock generator.

FIG. 1 is a schematic diagram of a single-phase clock generator 1 comprising an output 2 for the single-phase clock signal $\Phi_4$. Double-phase clock signals $\Phi_{1+2}$, and $\Phi_{3+4}$ are used with single-phase clock signal $\Phi_3$ in generating the $\Phi_4$ single-phase clock signal. The supply voltage V can be substituted for the clock signals $\Phi_{1+2}$ and $\Phi_3$ at terminals 3 and 4, respectively. If a $\Phi_2$ output signal is required, it is necessary to change the $\Phi_3$ clock signal to $\Phi_1$, the $\Phi_{1+2}$ clock signal to $\Phi_{3+4}$, and the $\Phi_{3+4}$ clock signal to a $\Phi_{1+2}$ clock signal.

The generator circuit 1 comprises an output field effect transistor driver 5 having capacitor 6 connected between its source electrode 7 and gate electrode 8. The drain electrode 9 of the field effect transistor is connected to terminal 10 for clock signal $\Phi_{3+4}$. The source electrode 7 is also connected to output 2 and to the drain electrode 11 of field effect transistor 12.

The source electrode 13 of field effect transistor 12 is connected to electrical ground. The gate electrode 14 of the field effect transistor 12 is connected through a field effect transistor 15 to terminal 3 for the $\Phi_{1+2}$ clock signal. The gate electrode 16 and drain electrode 17 of field effect transistor 15 are connected to terminal 3. The drain electrode 18 of field effect transistor 15 is connected to gate electrode 14 of field effect transistor 12.

Field effect transistor 19 is connected between gate electrode 14 and terminal 20 for single-phase clock signal $\Phi_3$. The drain electrode 21 of field effect transistor 19 is connected to terminal 20 and source electrode 22 is connected to the gate electrode 14 of field effect transistor 12. The gate electrode 23 of field effect transistor 19 is connected to terminal 24 for double-phase clock signal $\Phi_{3+4}$.

Gate electrode 8 of field effect transistor 5 is also connected through field effect transistor 25 to terminal 4 for clock signal $\Phi_3$. The gate electrode 26 and drain electrode 27 are connected to terminal 4. The source electrode 28 is connected to gate electrode 8.

The output includes a capacitor 29. The capacitor 29 represents the external load that the generator drives. The size of the output field effect transistors 5 and 12 depend upon the size of capacitor 29 that must be charged during the single-phase time of the input clock signal $\Phi_4$.

During $\Phi_3$, field effect transistors 5 and 12 are ratioed. As a result, DC power is consumed. DC power is also consumed for the same reason during $\Phi_1$ for the FIG. 2 embodiment. Therefore, DC power is consumed, or dissipated, only during $\Phi_3$ and $\Phi_1$ for the respective circuits. During the other phases of operation for the FIG. 1 and FIG. 2 embodiments, only transient power is required for charging capacitance.

Figure 2:
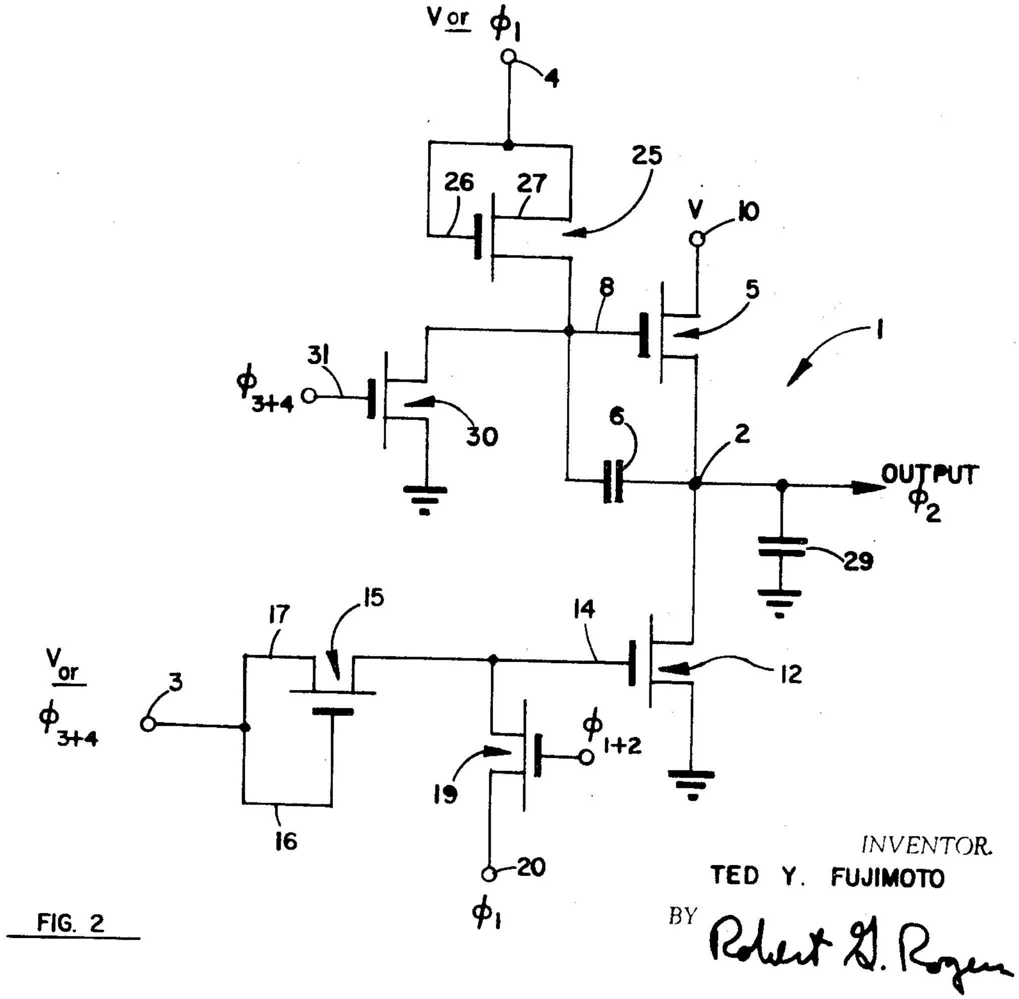
FIG. 2 is a schematic diagram of a second embodiment of a single-phase clock generator.

It is pointed out that the use of V at input terminals 3 and at terminals 4 for the FIG. 1 and FIG. 2 circuits, is not preferred. When the clock signals are replaced by the voltage V, the field effect transistors 15 and 19 are ratioed. As a result, additional power is dissipated. However, in certain cases it may be desirable to utilize the supply voltage without regard to the increased power dissipation.

Figure 3:
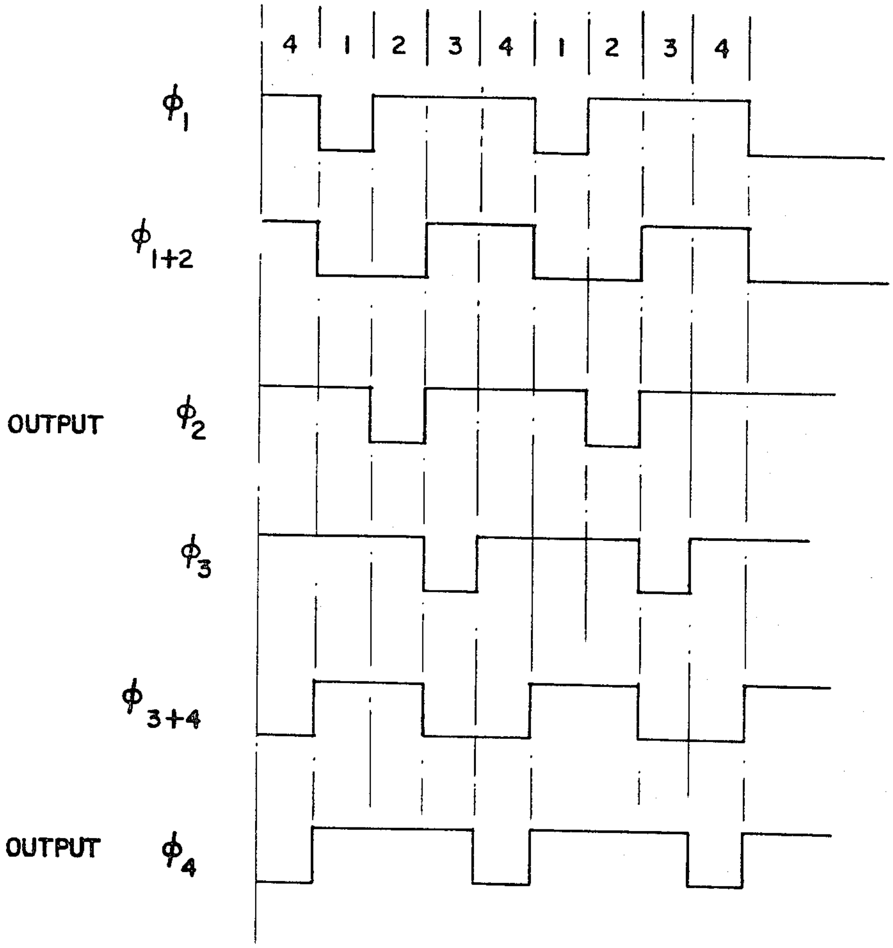
FIG. 3 is a diagram of single-phase and double-phase signals used in generating other single-phase clock signals by the FIG. 1 and FIG. 2 embodiments.

The operation of the FIG. 1 circuit can best be understood by referring to FIG. 3 in conjunction with FIG. 1. During the $\Phi_1$ phase of the $\Phi_{1+2}$ double-phase clock signal, field effect transistor 15 is turned on to supply a negative voltage to the gate electrode 14 of field effect transistor 12. The field effect transistor 19 is held off during the $\Phi_1$ phase since the $\Phi_{3+4}$ clock signal is false during the $\Phi_{1+2}$ phase times. As shown in FIG. 3, the $\Phi_{1+2}$ clock signal is true for two intervals, or phases, before the $\Phi_{3+4}$ clock signal becomes true.

The application of a negative voltage to the gate electrode of field effect transistor 12 turns the field effect transistor on and connects the output terminal 2 to electrical ground. Assuming that terminal 4 is connected to single-phase clock signal $\Phi_3$, the circuit operation would not change until the $\Phi_3$ phase time. During $\Phi_3$, field effect transistor 25 is turned on for charging capacitor 6 to the $\Phi_3$ voltage level minus the threshold drop through field effect transistor 25. The capacitor 6 actually charges to the difference between the approximate clock signal level of $\Phi_3$ and the electrical ground voltage level at output terminal 2.

Field effect transistor 12 remains on after $\Phi_{1+2}$ since field effect transistor 19 is turned on by clock signal $\Phi_{3+4}$ applied to its gate electrode. When field effect transistor 19 is turned on, the negative voltage level of clock signal $\Phi_3$, is applied to the gate electrode 14 instead of the $\Phi_{1+2}$ clock signal previously applied. Field effect transistor 15 is turned off at $\Phi_3$ time since $\Phi_{1+2}$ is false. It is pointed out that field effect transistor 19 may not turn on during $\Phi_3$ since the inherent capacitance (not shown) at the gate electrode 14 was charged to a negative voltage level during $\Phi_{1+2}$ approximately equal to the voltage level of $\Phi_3$.

At the end of the $\Phi_3$ phase time, capacitor 6 is fully charged and the $\Phi_3$ clock becomes false. The application of a false voltage level to gate electrode 14 of field effect transistor 12 turns the field effect transistor off. As a result, a relatively high impedance is inserted between the output terminal 2 and the electrical ground. Field effect transistor 25 is turned off when capacitor 6 was fully charged.

When field effect transistor 12 is turned off, the output voltage immediately changes from electrical ground to the negative voltage level of the $\Phi_{3+4}$ clock signal minus the threshold drop through field effect transistor 5. The change in voltage from electrical ground to a negative voltage level is fed back through capacitor 6 to boost the voltage on the gate electrode 8. The boosted gate electrode voltage substantially enhances the conduction of field effect transistor 5 for driving the output terminal 2 to the full negative voltage level of the $\Phi_{3+4}$ clock signal. In effect, the conduction is enhanced so that the impedance of the field effect transistor 5 is reduced. Therefore, the output changes from an electrical ground voltage level representing a false logic state to a negative voltage level representing a true logic state at the beginning of the $\Phi_4$ phase interval of the $\Phi_{3+4}$ clock signal.

At the end of the $\Phi_4$ phase time, i.e. at the beginning of $\Phi_l$, clock signal $\Phi_{3+4}$ becomes false. Since $\Phi_3$ is also false at $\Phi_1$ phase time, field effect transistor 25 and field effect transistor 5 are turned off. Field effect transistor 15 becomes conductive for applying a negative voltage to gate electrode 14 of field effect transistor 12. As a result, at $\Phi_1$ phase time the output 2 returns to a false voltage level. Therefore, the output remains in a true state for a single phase time, i.e. $\Phi_4$.

As indicated above, the FIG. 1 circuit could be used to generate a $\Phi_2$ single-phase clock signal by changing the position of the double-phase clock signals and by substituting the $\Phi_1$ for $\Phi_3$.

FIG. 2 is a schematic diagram of a different embodiment of a single-phase clock generator. The difference between the FIG. 2 clock generator and the FIG. 1 clock generator is the addition of field effect transistor 30 and the substitution of the supply voltage V for the clock signal appearing on terminal 10 of the FIG. 1 embodiment. For convenience, the same numbers are used to describe the circuit elements of the FIG. 2 embodiment.

The generator 1 comprises field effect transistor 5 connected between terminal 10 and output terminal 2. Capacitor 6 is connected between output terminal 2 and gate electrode 8 of field effect transistor 5. Field effect transistor 25 is connected between gate electrode 8 and terminal 4 for clock signal $\Phi_1$.

In addition, field effect transistor 30 is connected between gate electrode 8 and electrical ground. Field effect transistor 30 is controlled by clock signal $\Phi_{3+4}$ applied to its gate electrode 31. The gate electrode 26 and drain electrode 27 of field effect transistor 25 are connected to terminal 4.

Field effect transistor 12 is connected from output terminal 2 to electrical ground. Its gate electrode 14 is connected to terminal 3 for clock signal $\Phi_{3+4}$. Field effect transistor 15 having its gate electrode 16 and drain electrode 17 connected to terminal 3 is interposed between gate electrode 14 and terminal 3.

Field effect transistor 19 is connected between gate electrode 14 and terminal 20 for clock signal $\Phi_1$. Capacitor 29 is connected between the output 2 and electrical ground.

The various clock signals have been changed from FIG. 1 so that the FIG. 2 circuit provides a $\Phi_2$ single-phase clock signal at the output terminal 2. In other words, in FIG. 1 the $\Phi_{1+2}$ clock signal is applied to terminal 3. In FIG. 2, the $\Phi_{3+4}$ clock signal is applied to terminal 3. Similar changed have been made through the circuit as indicated.

The operation of the circuit can be seen more clearly by referring to FIG. 3. During the $\Phi_{3+4}$ clock interval, field effect transistor 12 and field effect transistor 31 are turned on for connecting gate electrode 8 and output terminal 2 to electrical ground. As a result, field effect transistor 5 is held off during the $\Phi_{3+4}$ clock intervals and the output is false.

During the $\Phi_1$ phase, field effect transistor 19 and field effect transistor 25 are turned on. As a result, capacitor 6 is charged to the difference between the electrical ground voltage on output terminal 2 and the approximate $\Phi_1$ clock signal interval appearing on the gate electrode 8. The clock signal level of $\Phi_1$ is reduced by the threshold drop across field effect transistor 25.

During $\Phi_2$, the $\Phi_1$ clock signals on terminal 4 become false. As a result, field effect transistor 25 turns off and the false voltage level applied to gate electrode 14 turns field effect transistor 12 off. When field effect transistor 12 turns off, the field effect transistor 5 is turned on during $\Phi_1$, remains on and drives the output 2 toward the supply voltage V. A threshold drop occurs across field effect transistor 5 for reducing the voltage at the output terminal 2 initially. However, the change in the output voltage from electrical ground to approximately V causes a change in the voltage across capacitor 6. The change is fed back to gate electrode 8 for boosting the voltage on the gate electrode by an amount to substantially enhance the conduction of field effect transistor 5. The enhanced conduction of the field effect transistor reduces the threshold drop for driving the output terminal 2 to the voltage level of the supply voltage V.

For the embodiment shown, the supply voltage V is equal to the voltage level of the clock signal. Therefore, by boosting the voltage on the gate electrode of field effect transistor 5, an output voltage having the level required for a clock signal is generated.

At the end of the $\Phi_2$ phase time, field effect transistor 19 is turned off and field effect transistor 12 is turned on by the $\Phi_{3+4}$ clock signal. As a result, the output terminal 2 is driven to a false voltage level. Field effect transistor 30 is turned on to hold the gate electrode 8 off. As a result, transistor 5 is held off for reducing power dissipation during $\Phi_{3+4}$. Transistor 25 is also turned off during $\Phi_{3+4}$ since $\Phi_1$ is false. Therefore, the output remains in a true voltage level only during the phase interval for the $\Phi_2$ single-phase clock.

I claim:

1. A single-phase clock signal field effect generator comprising, a first field effect transistor having source, drain, and gate electrodes, said source electrode connected to an output, a capacitor connected between said source electrode and said gate electrode, a second field effect transistor having a source, drain, and gate electrode, said source electrode being connected to the gate electrode of said first field effect transistor, a third field effect transistor having a source, drain, and gate electrode, said drain electrode connected to said output, a fourth field effect transistor having a source, drain, and gate electrode, said source electrode connected to the gate electrode of said third field effect transistor, a fifth field effect transistor having a source, drain and gate electrode, said source electrode connected to the gate electrode of said third field effect transistor, and to the source electrode of said fourth field effect transistor.

2. The generator recited in claim 1 further including a sixth field effect transistor having a source, drain, and gate electrode, said drain electrode being connected to the gate electrode of said first field effect transistor.

3. A single-phase clock signal generator using double- and single-phase clock signals of a multiphase clock cycle, said generator comprising, a first field effect transistor driver connected between a voltage level and an output and having a gate electrode, said voltage level being provided at the output at least during the phase interval of the single-phase clock signal being generated, a capacitor connected between the output and the gate electrode for feeding back the output voltage to the gate electrode during the single phase of the clock signal being generated, a second field effect transistor connected to the gate electrode for precharging the capacitor prior to the single phase of the clock signal being generated, a third field effect transistor connected between the output and a referenced voltage level, said third field effect transistor having a gate electrode connected to a voltage level transistor having a gate electrode connected to a voltage level for holding said field effect transistor on until the single-phase of the generated clock signal and said gate electrode being connected to a different voltage level for holding said field effect transistor off during the phase of the clock signal being generated, the application of said voltage levels to said gate electrode being controlled by a different single-phase clock signal and by at least one double-phase clock signal, a fourth field effect transistor connected between the gate electrode of said third field effect transistor and said different single-phase clock signal, said fourth field effect transistor being gated by a double-phase clock signal with the first phase of said double-phase clock signal being equal to the phase of said different single-phase clock signal whereby during the first phase of said double-phase clock signal said different single-phase clock signal is applied to the gate electrode of said third field effect transistor for holding said third field effect transistor on, said single phase immediately preceding the single phase of the single-phase clock being generated, said different single-phase clock signal being false during the second phase of said double-phase clock signal, said fourth field effect transistor being on during said second phase for applying said false signal level to the gate electrode of said third field effect transistor whereby said third field effect transistor is turned off, said third field effect transistor being off at the beginning of the phase of the single-phase clock signal being generated for enabling a voltage level to appear at the output, the voltage level appearing at said output being fed back across said capacitor to the gate electrode of said first field effect transistor for boosting the gate electrode voltage of said first field effect transistor, said boosted gate electrode voltage enhancing the conduction of said first field effect transistor for substantially overcoming the inherent threshold voltage loss across said first field effect transistor whereby the output is driven to approximately said first recited voltage level without a threshold loss.

4. The generator recited in claim 3 wherein said second field effect transistor is clocked by said different single-phase clock signal, the phase of said different single-phase clock signal immediately preceding the phase of the generated single-phase clock signal whereby said precharging occurs during the phase of said multiphase clock cycle immediately preceding the phase of the generated clock signal, said voltage level being provided by said double-phase clock signal, the later-occurring phase of said double-phase clock signal comprising the phase during which said single-phase clock signal is generated, a fifth field effect transistor connected between the gate electrode of said first field effect transistor and said reference voltage level, said fifth field effect transistor being gated by a double-phase clock signal having a distinct phase relationship relative to said first recited double-phase clock signal for holding the gate electrode of said first field effect transistor at said reference voltage level until the phase immediately preceding the phase of the generated single-phase clock signal.

5. The generator recited in claim 3 wherein a voltage level is applied to the gate electrode of said third field effect transistor through a field effect transistor connected in series between said voltage level and said gate electrode, said voltage being applied to said gate electrode during the phase times of said multiphase clock cycle immediately preceding the phase times of said first recited double-phase clock signal, said voltage level being provided by a double-phase clock signal which precedes in phase said first-recited double-phase clock signal, said series-connected field effect transistor having its gate electrode connected to said second-recited double-phase clock signal.

PO-1050
(5/69)

UNITED STATES PATENT OFFICE
CERTIFICATE OF CORRECTION

Patent No. 3,629,618 Dated December 21, 1971

Inventor(s) Ted Y. Fujimoto

It is certified that error appears in the above-identified patent and that said Letters Patent are hereby corrected as shown below:

In Column 6, Claim 3, line 24, after "clock" and before "being" insert --signal--.

Signed and sealed this 30th day of May 1972.

(SEAL)
Attest:

EDWARD M.FLETCHER,JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,629,618 Dated December 21, 1971

Inventor(s) Ted Y. Fujimoto

It is certified that error appears in the above-identified patent and that said Letters Patent are hereby corrected as shown below:

Claim 3, Column 6, line 4, delete "transistor having a gate electrode connected to a".

Claim 3, Column 6, line 5, delete "voltage level".

Signed and sealed this 13th day of February 1973.

(SEAL)
Attest:

EDWARD M.FLETCHER,JR.
Attesting Officer

ROBERT GOTTSCHALK
Commissioner of Patents

7